Nov. 7, 1933.  C. Y. VICTOR  1,933,946
EGG CANDLER
Filed May 25, 1933
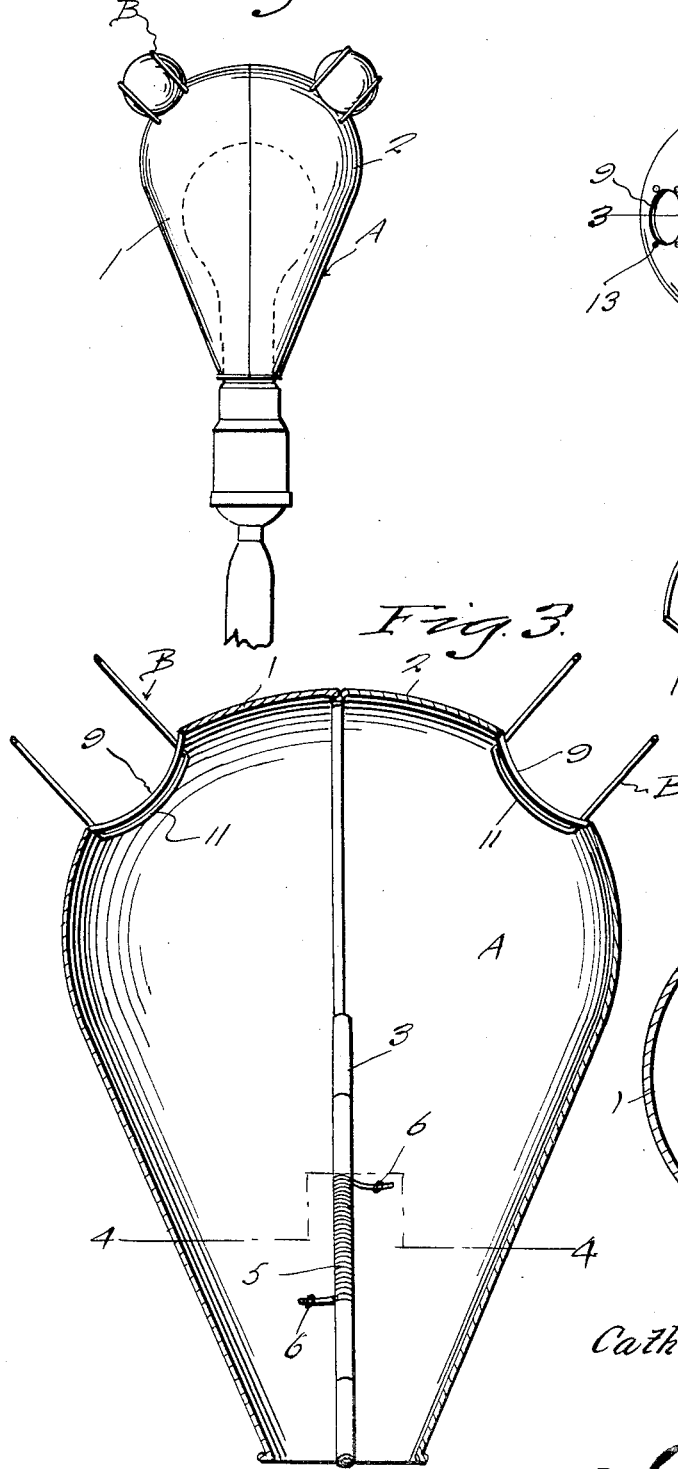
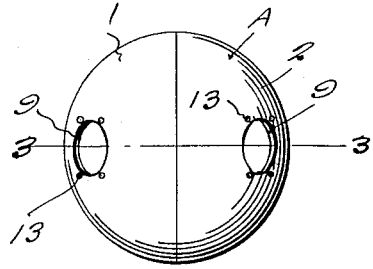
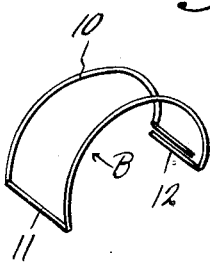
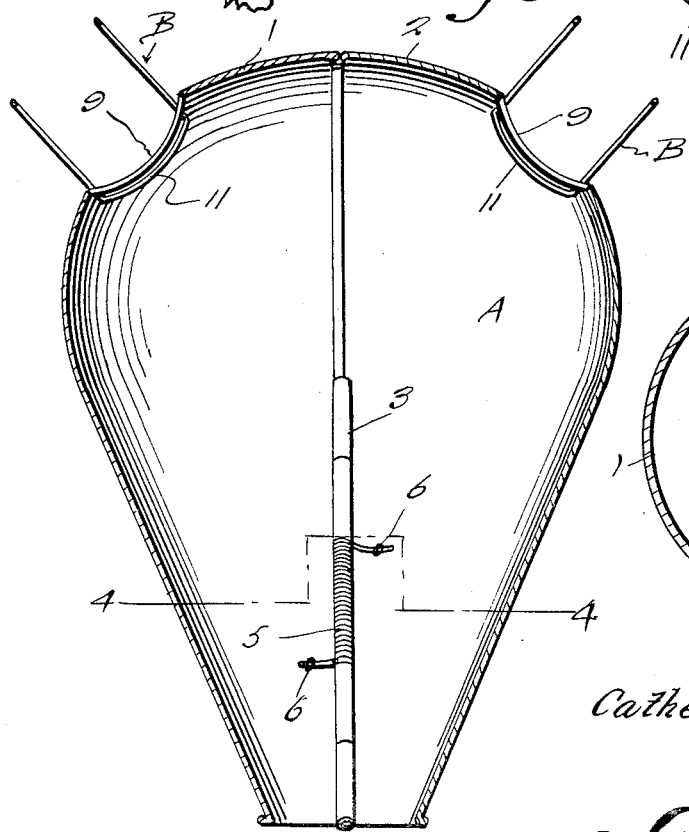
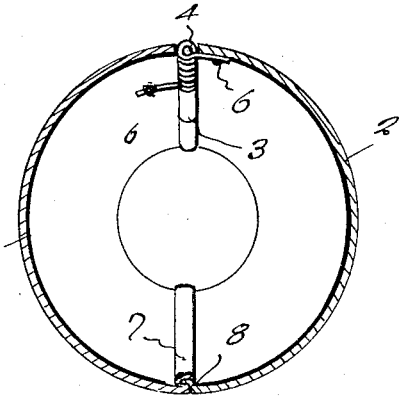
Inventor
Catherine Y. Victor
By Clarence A. O'Brien
Attorney Patented Nov. 7, 1933

1,933,946

UNITED STATES PATENT OFFICE 1,933,946

EGG CANDLER

Catherine Y. Victor, Detroit, Mich.

Application May 25, 1933. Serial No. 672,875

4 Claims. (Cl. 99—6)

This invention relates to an egg candler or tester, the general object of the invention being to provide an inexpensive device formed of two sections hingedly connected together, whereby the device can readily be placed on an electric bulb, flashlight or other source of light, with means for supporting eggs over openings formed in the device, so that the eggs can be candled.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a view of the device attached to an electric lamp which is supported in vertical position.

Figure 2 is a top plan view of the device.

Figure 3 is a section on line 3—3 of Figure 2.

Figure 4 is a section on line 4—4 of Figure 3.

Figure 5 is a view of one of the egg holding members.

As shown in these views, the device comprises a body A, preferably of the shape shown, with its small end open and said body is composed of the two sections 1 and 2. Each section, at one side edge thereof, is formed with the barrels 3 for receiving the hinge pin 4 for hingedly connecting the two sections together, and a spring 5 is coiled about a part of the pin and has its ends connected to the two sections, as shown at 6, so that this spring normally holds the two sections together in closed position, but will permit them to be moved apart. The opposite side edge of one of the sections is shaped to form a groove or channel 7 for receiving the bent edge 8 of the other section so as to provide a substantially light-tight joint between the two sections when they are in closed position.

A number of openings 9 is formed in the upper part of the device and a substantially U-shaped member B extends over each opening to hold an egg over the opening, as shown in Figure 1. Each member B is formed of a single piece of wire bent to provide a pair of spaced curved legs 10 connected together at one end by a cross piece 11 and having their free ends bent inwardly and overlapping each other, as shown at 12. The ends of each member are threaded through the four holes 13 formed in the device adjacent each of the openings 9, so that the parts 11 and 12 are located within the device, while the legs 10 form a pair of loops exteriorly of the device and adjacent the opening 9 so that an egg can be forced between the loops and held in place over the opening, as shown in Figure 1.

Thus the eggs can be readily put in place and inspected and then easily removed, so that other eggs can be put in position to be tested or inspected.

By making the device in two sections and connecting the sections together by a spring hinge, the device can be readily placed over electric lamps, flashlights, or even a candle or other light and it may be also placed over the bulb of a headlamp or the like of an automobile, so that eggs can be tested from this lamp. This will permit a motorist buying eggs in the country or alongside the road to test the eggs before taking them home.

The inner sides of the sections 1 and 2 are preferably burnished or otherwise provided with reflecting surfaces to increase the candling efficiency of the device.

Manifestly, the interior arrangement of the hinge elements and the spring is calculated to prolong the usefulness of the device, because it avoids exterior projections and better adapts the device to be carried in a tool box.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. An egg testing device of the class described comprising a hollow body formed of two sections, a spring hinge for connecting the sections together, said body having a small open end for fitting over a lamp and the body having openings therein over which the eggs which are to be tested are placed.

2. An egg testing device comprising a hollow body having an enlarged end portion with the rest of the body tapering from the enlarged portion to the opposite end which is open, said body being formed of two sections, a spring hinge for connecting the sections together, each section having an opening in its enlarged portion and a spring holder extending over the opening of each section for holding an egg in position over the opening.

3. An egg testing device comprising a hollow body having an enlarged end portion with the rest of the body tapering from the enlarged portion to the opposite end which is open, said body being formed of two sections, a spring hinge for connecting the sections together, each section having an opening in its enlarged portion and a spring holder extending over the opening of each section for holding an egg in position over the opening, the hinge elements and spring being arranged interiorly of the body, a light-tight joint being provided between the free edges of the sections, and the sections being provided with interior reflecting surfaces.

4. An egg testing device of the class described comprising a hollow body formed of two sections, said body apertured to receive eggs to be tested and being open at one end for fitting over a lamp, and a spring hinge connecting the body sections together and yieldingly maintaining the body in a closed state.

CATHERINE Y. VICTOR.